(12) United States Patent
Nakazawa et al.

(10) Patent No.: US 7,330,470 B2
(45) Date of Patent: Feb. 12, 2008

(54) ROUTER AND SIP SERVER

(75) Inventors: Hiroaki Nakazawa, Chigasaki (JP);
Atsushi Tachikawa, Yokohama (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 520 days.

(21) Appl. No.: 11/033,408

(22) Filed: Jan. 12, 2005

(65) Prior Publication Data

US 2005/0213591 A1    Sep. 29, 2005

(30) Foreign Application Priority Data

Mar. 26, 2004    (JP)    ............... 2004-092115

(51) Int. Cl.
*H04L 12/56*    (2006.01)
(52) U.S. Cl. .................. 370/392; 370/400; 379/88.17; 709/228
(58) Field of Classification Search ........ 370/351–356, 370/400, 401, 392; 379/88.17; 709/227–229
See application file for complete search history.

(56) References Cited

U.S. PATENT DOCUMENTS

2004/0131042 A1*    7/2004    Lillie et al. ............... 370/351

2005/0073997 A1*    4/2005    Riley et al. ............... 370/352

FOREIGN PATENT DOCUMENTS

| JP | 2002-118594 | 4/2002 |
|---|---|---|
| JP | 2002-335267 | 11/2002 |
| JP | 2003-022223 | 1/2003 |
| JP | 2003-108527 | 4/2003 |
| JP | 2003-229893 | 8/2003 |

* cited by examiner

*Primary Examiner*—John Pezzlo
(74) *Attorney, Agent, or Firm*—Mattingly, Stanger, Malur & Brundidge, P.C.

(57) ABSTRACT

A boundary node router determines whether a received packet includes a SIP message and a REGISTER message, and, if so, adds its router identifier to a REGISTER message which includes a user identifier and a user terminal identifier, sent from a user terminal, and sends the message to a SIP server. The SIP server has a user management table which stores the user terminal identifier, the router identifier of a router which serves the user terminal, and a predetermined Quality of Service type, in association with each user identifier. The SIP server extracts a user identifier, a user terminal identifier, and a router identifier from a received REGISTER message, and updates the user terminal identifier and the router identifier corresponding to the extracted user identifier, to the extracted user terminal identifier and the extracted router identifier.

9 Claims, 13 Drawing Sheets

70: MESSAGE TYPE

REGISTER sip:regsrv1.left.net SIP/2.0
Via: SIP/2.0/UDP hostA.left.net:5080;branch=z9hG4bK778sa9
Max-Forwards: 50
From: UserA <sip:UserA@left.net>
To: UserA <sip:UserA@left.net>
Call-ID: 5012234@left.net
Cseq: 417 REGISTER
Contact: <sip:UserA@10.10.20.10>
Expires: 8000
Contact-Length: 0

72: USER TERMINAL ADDRESS  71: USER NAME

FIG. 5

70: MESSAGE TYPE

REGISTER sip:regsrv1.left.net SIP/2.0
Via: SIP/2.0/UDP hostB.center.net:5080;branch=z9hG4bK774as7
Max-Forwards: 50
From: UserA <sip:UserA@left.net>
To: UserA <sip:UserA@left.net>
Call-ID: 5012234@left.net
Cseq: 417 REGISTER
Contact: <sip:UserA@10.10.20.10>
Expires: 8000
QoS-Router: 172.21.20.1
Contact-Length: 0

73: BOUNDARY NODE ROUTER INFORMATION  72: USER TERMINAL ADDRESS  71: USER NAME

FIG. 6

160: MESSAGE TYPE  161: USER NAME  142

SIP/2.0 401 Unauthorized
From: UserA <sip:UserA@left.net>
To: UserA <sip:UserA@left.net>
Call-ID: 5012234@left.net
Cseq: 417 REGISTER
Via: SIP/2.0/UDP hostB.center.net:5080;branch=z9hG4bK774as7
Contact-Length: 0
WWW-authenticate: Digest realm="left.net",domain="left.net",
nonce="TMRzMzb3MTXZLRk5MjMNTCxxxx",algorithm=MD5
Server: ZZZZZZZ Sip Serv Ver 2.3
Organization: ZZZZZZZ SIP Server

Fig.16

160: MESSAGE TYPE  161: USER NAME  144

SIP/2.0 401 Unauthorized
From: UserA <sip:UserA@left.net>
To: UserA <sip:UserA@left.net>
Call-ID: 5012234@left.net
Cseq: 417 REGISTER
Via: SIP/2.0/UDP hostB.center.net:5080;branch=z9hG4bK774as7
QoS-Router: 172.21.20.1
Contact-Length: 0
WWW-authenticate: Digest realm="left.net",domain="left.net",
nonce="TMRzMzb3MTXZLRk5MjMNTCxxxx",algorithm=MD5
Server: ZZZZZZZ Sip Serv Ver 2.3
Organization: ZZZZZZZ SIP Server

163: BOUNDARY NODE ROUTER

Fig.17

180: MESSAGE TYPE                                                                133

REGISTER sip:regsrv1.left.net SIP/2.0
Via: SIP/2.0/UDP hostA.left.net:5080;branch=z9hG4bK778sa9
Max-Forwards: 50
From: UserA <sip:UserA@left.net>
To: UserA <sip:UserA@left.net>
Call-ID: 5012234@left.net
Cseq: 419 REGISTER
Authorization: Digest username="UserA",realm="left.net",
uri="sip:172.18.185.179",response="23df8487c9a73d38",
nonce="TMRzMzb3MTXZLRk5MjMNTCxxxx",algorithm=MD5
Contact: <sip:UserA@10.10.20.10>
Expires: 8000
Contact-Length: 0

182: USER TERMINAL ADDRESS          181: USER NAME

Fig.18

180: MESSAGE TYPE                                                                145

REGISTER sip:regsrv1.left.net SIP/2.0
Via: SIP/2.0/UDP hostB.center.net:5080;branch=z9hG4bK774as7
Max-Forwards: 50
From: UserA <sip:UserA@left.net>
To: UserA <sip:UserA@left.net>
Call-ID: 5012234@left.net
Cseq: 419 REGISTER
Authorization: Digest username="UserA",realm="left.net",
uri="sip:172.18.185.179",response="23df8487c9a73d38",
nonce="TMRzMzb3MTXZLRk5MjMNTCxxxx",algorithm=MD5
Contact: <sip:UserA@10.10.20.10>
Expires: 8000
QoS-Router: 172.21.20.1
Contact-Length: 0

183: BOUNDARY NODE        182: USER TERMINAL        181: USER NAME
ROUTER INFORMATION             ADDRESS

Fig.19

ROUTER AND SIP SERVER

BACKGROUND OF THE INVENTION

1. Field of the Invention

The present invention relates to routers and Session Initiation Protocol (SIP) servers, and more specifically, to a router incorporating a technology for controlling the Quality of Service (QoS) of packets in an Internet Protocol (IP) network and a SIP server specifying the QoS of the router through the IP network.

2. Description of the Related Art

As broadband access to an IP network has become widespread in recent years, applications requiring real-time capabilities such as telephony and live video distribution on the IP network have been increasing. The IP network is originally configured by a best-effort network and may not be ready for communication with near-real-time characteristics.

Technologies for assuring the QoS of a network have become important, and a variety of such technologies have been standardized. One of those technologies currently used is a traffic-oriented control technology referred to as Differentiated Services (Diff-Serv).

In a Diff-Serv network made up of boundary nodes and interior nodes, different levels of Quality of Service are provided by relatively varying transfer capabilities, for instance, in accordance with a Differentiated Services Code Point (DSCP) value specified in each packet. The DSCP value of an Internet Protocol Version 4 (IPv4) packet is specified in the Type of Service (ToS) field of the IPv4 header. The DSCP value of an Internet Protocol Version 6 (IPv6) packet is specified in the Traffic class field of the IPv6 header.

The DSCP value can be specified initially by a user terminal of an end user who can recognize a service. The DSCP value in each header can also be rewritten by a boundary node router when a certain condition is met. General conditions specified in the boundary node router include an IP address, a TCP port number, a UDP port number, and others.

More specifically, packets to be given higher priority are selected and marked, and the marked packets are allowed to pass the network ahead of the other packets. The manner of prioritization is managed by each router.

SIP has come into widespread use as a protocol of real-time communication such as telephony on an IP network. SIP is a signaling protocol for establishing a session necessary for communication and for changing and disconnecting the session. The establishment of a SIP session includes negotiations on a service using the session, the number of the port to be used, a communication protocol, and others. Accordingly, SIP can be easily combined with a different existing protocol and has a high extensibility.

One technology for use in a Diff-Serv network or a SIP network as described above is disclosed in patent document 1 indicated below, for instance. The technology blocks voice communication which is not permitted by a SIP server, by providing a firewall function which can be controlled from a call processing server (SIP server) for access servers, boundary node routers, and other access apparatuses provided in access points where a carrier network is connected, on a router basis. Patent document 1 also discloses a technology of allowing an access apparatus provided in an access point to specify the QoS of a packet identified by a combination of a source IP address, a destination IP address, a source port number, a destination port number, and others, as instructed by the SIP server. Another technology disclosed in the document allows the SIP server to store information indicating which user terminal is served by which access apparatus, together with the Internet telephone user information stored as the user information.

A switch disclosed in patent document 2 indicated below, for instance, has a function to convert a non-SIP signal output by a non-SIP terminal, such as a PBX signal, into an SIP message, and vice versa. This function enables communication between a non-SIP telephone and a SIP terminal.

With the technologies disclosed in patent documents 3 and 4 indicated below, for instance, if a caller or a calling terminal sends a SIP protocol message including additional information describing the intention of the caller, the server identifies a called party optimum for the intention and establishes a SIP session accordingly.

Patent Document 3 describes that a caller-side end point generates a SIP INVITE request which includes the standard routing information in its header portion and the additional information on the intention of the caller in its body portion. For instance, the header may contain the address of a consumer electric manufacturer, and the additional information given in the body may contain keywords associated with the caller such as "washing machine," "service," and "model ABC." In accordance with the information, the call is directed to a salesperson skilled in answering questions about services of washing machine model ABC.

Patent Document 4 discloses a method in which a proxy server judges the most accurate address to which a call is directed, using the routing information specified in the INVITE message and detected voice cookie information. If a call is made to a customer sales division and if detected voice cookie information includes the name of the salesperson who talked with the caller most recently, the proxy server automatically directs the call to the salesperson, not to any other salesperson available.

A method disclosed in patent document 5, for instance, enables mutual authentication between a SIP client and a SIP proxy, by incorporating a Kerberos security system in the message flow of the SIP signaling operation. When the SIP proxy receives a request message from the SIP client, the SIP proxy sends a challenge message indicating that Kerberos authentication is necessary. In response to the message, the SIP client sends a second request message including authentication data containing a Kerberos server ticket to the proxy. Then, the proxy authenticates a client user.

[Patent Document 1] Japanese Unexamined Patent Application Publication No. 2003-229893

[Patent Document 2] Japanese Unexamined Patent Application Publication No. 2002-118594

[Patent Document 3] Japanese Unexamined Patent Application Publication No. 2002-335267

[Patent Document 4] Japanese Unexamined Patent Application Publication No. 2003-22223

[Patent Document 5] Japanese Unexamined Patent Application Publication No. 2003-108527

Suppose that a SIP server and a boundary node router jointly implement the Diff-Serv function, using the conventional technologies. The SIP server stores beforehand information indicating which boundary node router is connected to the Internet telephone of the corresponding user, or information correlating the address of the user terminal to the address of the boundary node router serving the user. Based on the information, the SIP server specifies the QoS requested by the user in the boundary node router serving the user terminal.

If the boundary node router serving the user terminal is changed because of the movement of the user terminal to another site, the addition of a new boundary node router, a change in the network configuration, and other reasons, the QoS of the user cannot be assured. If the user uses a user terminal which is not associated with a boundary node router, the same problem occurs.

Conventionally, each time the relationship between a user terminal and a boundary node router serving the terminal is changed by moving the user terminal or the like, the maintenance person updates the corresponding management information of the SIP server. If a large amount of information must be changed, the update operation will take a long time, and user QoS control cannot be specified for a certain period. An error in the updated information may hinder correct QoS control.

SUMMARY OF THE INVENTION

Accordingly, in view of the foregoing points, it is an object of the present invention to provide a router and a SIP server which can provide an unchanged QoS service to the user even after the user terminal is moved. Another object of the present invention is to provide a QoS service specified for the user even when the user uses a terminal which is not registered in advance. A further object of the present invention is to provide a QoS service specified for the user even after a new boundary node router is added or even after a network configuration is changed. A still further object of the present invention is to dynamically update the corresponding management information of the SIP server if the relationship between the user terminal and the boundary node router serving the terminal is changed.

One of the foregoing objects is achieved in one aspect of the present invention through the provision of a router for serving a user terminal and connecting the terminal to an IP network. The router includes a first channel interface block for receiving a message sent from the user terminal, a determination block for analyzing the message received by the first channel interface block and determining whether a predetermined message is received, an information addition block for adding the information of the router itself to the message if the determination block determines that the predetermined message is received, and a second channel interface block for sending the predetermined message to which boundary node router information created by the information addition block has been added, to the IP network.

One of the foregoing objects is achieved in another aspect of the present invention through the provision of a router for serving a user terminal and connecting the terminal to an IP network. The router includes a second channel interface block for receiving a message sent from the IP network, a determination block for analyzing the message received by the second channel interface block and determining whether a predetermined message is received, an information addition block for adding the information of the router itself to the message if the determination block determines that the predetermined message is received, and a first channel interface block for sending the predetermined message to which boundary node router information created by the information addition block has been added, to the user terminal.

One of the foregoing objects is achieved in another aspect of the present invention through the provision of a SIP server for being connected to an IP network and for performing QoS control for an IP packet of Realtime Transport Protocol (RTP) or RTP control protocol (RTCP) identified by the port number and the IP address of a user terminal. The SIP server includes a storage block for storing the router serving position information of a user terminal, a reception block for receiving a message sent from the router, and a serving position update block for updating the information of the storage block if the message received by the reception block is a predetermined message.

One of the foregoing objects is achieved in another aspect of the present invention through the provision of a router for serving a communication terminal which sends a REGISTER message including a user identifier and a terminal identifier and for performing Quality of Service control for each user under an instruction from a server; the router being used in a network system comprising a SIP server for storing a terminal identifier of the communication terminal, a router identifier of the router serving the communication terminal, and a certain Quality of Service type, in association with the user identifier, and for instructing the router identified by the corresponding router identifier to perform Quality of Service control in accordance with the Quality of Service type corresponding to the user identifier or the terminal identifier; the router comprising: means for judging whether a received packet or a received message is a SIP message; means for analyzing and determining whether the message judged to be a SIP message is a REGISTER message, for adding the router identifier of the local router to the REGISTER message including the user identifier and terminal identifier given by the communication terminal if the message is a SIP message and a REGISTER message, and for transferring the REGISTER message including the added router identifier to the SIP server so that the terminal identifier and router identifier stored in association with the user identifier are updated in the SIP server; means for receiving a Quality of Service control instruction corresponding to the Quality of Service type associated with the user identifier or the updated terminal identifier, from the SIP server; and means for performing Quality of Service control for each user under the received instruction.

One of the foregoing objects is achieved in another aspect of the present invention through the provision of a router for serving a communication terminal which sends, in response to an instruction message given for authentication, a REGISTER message including a user identifier, a terminal identifier, and a router identifier included in the instruction message and for performing Quality of Service control for each user under an instruction from a server; the router being used in a network system comprising a SIP server for storing a terminal identifier of the communication terminal, a router identifier of the router serving the communication terminal, and a certain Quality of Service type, in association with the user identifier, for instructing the router identified by the corresponding router identifier to perform Quality of Service control in accordance with the Quality of Service type corresponding to the user identifier or the terminal identifier, and for sending an instruction message for authentication to the communication terminal; the router comprising: means for judging whether a received packet or a received message is a SIP message; means for analyzing and determining whether the message judged to be a SIP message is an instruction message, for adding the router identifier of the local router to the instruction message or updating the router identifier included in the instruction message to the router identifier of the local router, if the message is a SIP message and an instruction message, and for transferring the instruction message including the added or updated router identifier to the communication terminal so as to make the communication terminal send a REGISTER message and to update the terminal identifier and the router identifier stored in association with the user identifier in the SIP server; means for receiving a Quality of Service control instruction corresponding to the Quality of Service type associated with the user identifier or the updated terminal identifier, from the SIP server; and means for performing Quality of Service control for each user under the received instruction.

One of the foregoing objects is achieved in another aspect of the present invention through the provision of a SIP server for managing the Quality of Service type of each user and for instructing a router serving a communication terminal to perform Quality of Service control in accordance with the Quality of Service type of each user, and the SIP server is used in a network system which includes the router, the router serving a communication terminal which sends a REGISTER message including a user identifier and a terminal identifier to be used or a communication terminal which sends, in response to an instruction message given for authentication, a REGISTER message including a user identifier, a terminal identifier, and a router identifier included in the instruction message, and performing Quality of Service control for each user under an instruction from a server. The SIP server includes a table for storing a terminal identifier of the communication terminal, a router identifier of the router serving the communication terminal, and a certain Quality of Service type, in association with the user identifier; means for analyzing a received message and determining whether the message is a REGISTER message; means for extracting a user identifier, a terminal identifier, and a router identifier, if the message is a REGISTER message, from a REGISTER message generated when the router has added the router identifier of the router to the REGISTER message including the user identifier and the terminal identifier given by the communication terminal or from a REGISTER message sent from the communication terminal in response to an instruction message to which the router has added or updated the router identifier, sent from the server to the communication terminal, for referencing the table in accordance with the extracted user identifier, and for updating the terminal identifier and the router identifier associated with the corresponding user identifier to the extracted terminal identifier and the extracted router identifier; and means for instructing the router identified by the updated router identifier to perform Quality of Service control in accordance with a Quality of Service type associated with the user identifier or the updated terminal identifier, with reference to the table.

One of the foregoing objects is achieved in another aspect of the present invention through the provision of a network system including a router for serving a communication terminal which sends a REGISTER message including a user identifier and a terminal identifier and for performing Quality of Service control for each user under an instruction from a server, and a SIP server for managing the Quality of Service type of each user and for instructing the router serving the communication terminal to perform Quality of Service control in accordance with the Quality of Service type of each user. The router includes means for judging whether a received packet or a received message is a SIP message; means for analyzing and determining whether the message judged to be an SIP message is a REGISTER message, for adding the router identifier of the local router to the REGISTER message including the user identifier and terminal identifier given by the communication terminal if the message is a SIP message and a REGISTER message, and for transferring the REGISTER message with the router identifier added to the SIP server so that the terminal identifier and router identifier stored in association with the user identifier are updated in the SIP server; means for receiving a Quality of Service control instruction corresponding to the Quality of Service type associated with the user identifier or the updated terminal identifier, from the SIP server; and means for performing Quality of Service control for each user under the received instruction. The SIP server includes a table for storing a terminal identifier of the communication terminal, a router identifier of the router serving the communication terminal, and a certain Quality of Service type, in association with the user identifier; means for analyzing a received message and determining whether the message is a REGISTER message; means for extracting a user identifier, a terminal, identifier, and a router identifier, if the message is a REGISTER message, from a REGISTER message generated when the router has added the router identifier of the router to the REGISTER message including the user identifier and the terminal identifier given by the communication terminal, for referencing the table in accordance with the extracted user identifier, and for updating the terminal identifier and the router identifier associated with the corresponding user identifier to the extracted terminal identifier and the extracted router identifier; and means for instructing the router identified by the updated router identifier to perform Quality of Service control in accordance with a Quality of Service type associated with the user identifier or the updated terminal identifier, with reference to the table.

One of the foregoing objects is achieved in another aspect of the present invention through the provision of a network system including a router for serving a communication terminal which sends, in response to an instruction message given for authentication, a REGISTER message including a user identifier, a terminal identifier to be used, and a router identifier included in the instruction message and for performing Quality of Service control for each user under an instruction from a server, and a SIP server for managing the Quality of Service type of each user, for instructing the router serving the communication terminal to perform Quality of Service control in accordance with the Quality of Service type of each user, and for sending an instruction message for authentication to the communication terminal. The router includes means for judging whether a received packet or a received message is a SIP message; means for analyzing and determining whether the message judged to be a SIP message is an instruction message, for adding the router identifier of the local router to the instruction message or updating the router identifier included in the instruction message to the router identifier of the local router if the message is a SIP message and an instruction message, and for transferring the instruction message including the added or updated router identifier to the communication terminal so as to make the communication terminal send a REGISTER message and to update the terminal identifier and the router identifier stored in association with the user identifier in the SIP server; means for receiving a Quality of Service control instruction corresponding to the Quality of Service type associated with the user identifier or the updated terminal identifier, from the SIP server; and means for performing Quality of Service control for each user under the received instruction. The SIP server includes a table for storing a terminal identifier of the communication terminal, a router identifier of the router serving the communication terminal, and a certain Quality of Service type, in association with the user identifier; means for analyzing a received message and determining whether the message is a REGISTER message; means for extracting a user identifier, a terminal identifier, and a router identifier, if the message is a REGISTER message, from a REGISTER message sent from the communication terminal in response to an instruction message to which the router has added or updated the router identifier of the router, sent from the server to the communication terminal, for referencing the table in accordance with the extracted user identifier, and for updating the terminal identifier and the router identifier associated with the corresponding user identifier to the extracted terminal identifier and the extracted router identifier; and means for instructing the router identified by the updated router identifier to perform Quality of Service control in accordance with the Quality of Service type associated with the user identifier or the updated terminal identifier, with reference to the table.

The present invention can provide a network system, a SIP server, and a router which can provide an unchanged QoS service to the user even if the user terminal is moved. The present invention enables a QoS service specified for the user to be provided even when the user uses a non-registered terminal. With the present invention, a QoS service specified for the user can be provided even if a new boundary node router is added or even if the network configuration is changed. The present invention enables dynamic updating of the corresponding management information of the SIP server when the relationship between the user terminal and the boundary node router serving the terminal changes.

With the present invention, if a user terminal is moved or added in a network where a SIP server and a boundary node router jointly implement QoS control, the SIP server can dynamically identify the router serving the user terminal. When the user position is stored in accordance with a REGISTER message sent by the user terminal, the stored information of relationship between the user terminal and the boundary node router serving the user terminal can be automatically updated in the SIP server. Accordingly, the SIP server makes the same QoS setting for the same user, either with the previous boundary node router or with the new boundary node router. Even when the user terminal is moved, an unchanged QoS service can be provided for the user.

BRIEF DESCRIPTION OF THE DRAWINGS

FIG. 5 is a view showing the header of a REGISTER message.

FIG. 6 is a view showing the header of another REGISTER message.

FIG. 16 is a view showing the header of an Unauthorized message.

FIG. 17 is a view showing the header of another Unauthorized message.

FIG. 18 is a view showing the header of a REGISTER message.

FIG. 19 is a view showing the header of another REGISTER message.

DESCRIPTION OF THE PREFERRED EMBODIMENTS

Embodiments of the present invention will be described below.

1. First Embodiment (Apparatus Configuration)

Figure 1:
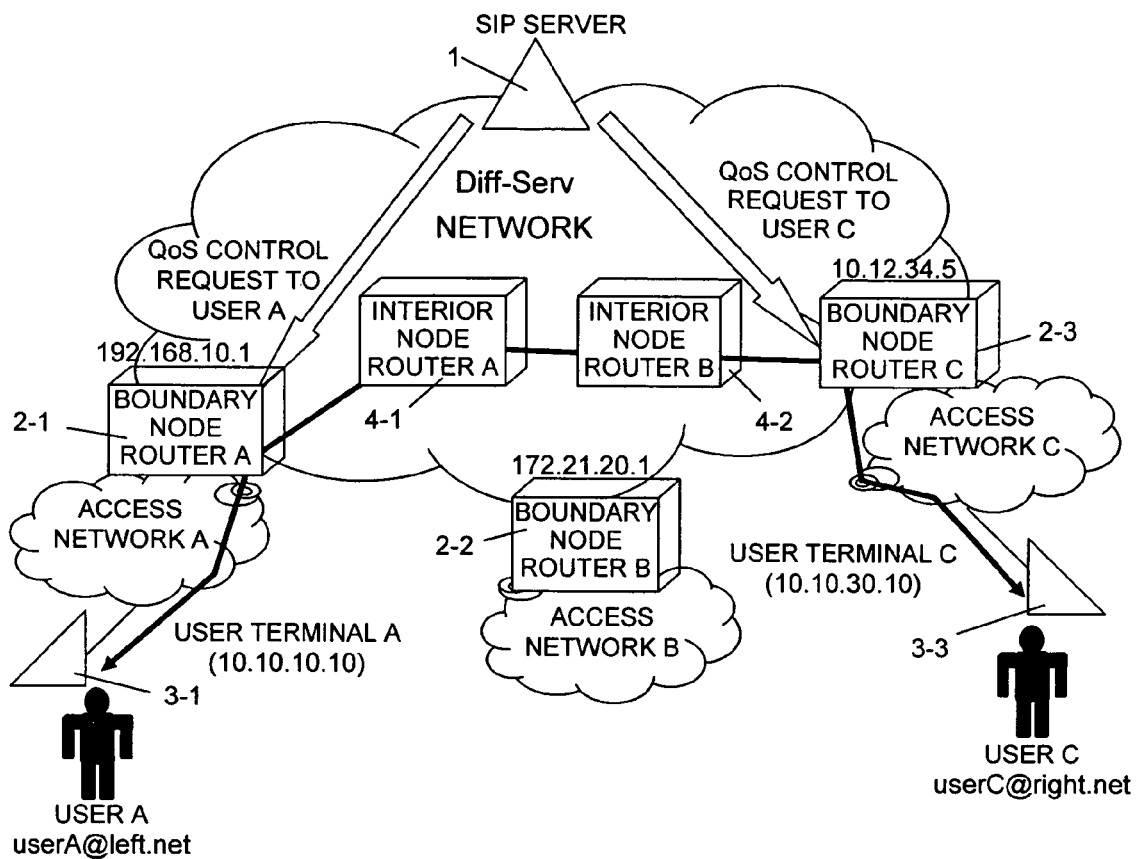
FIG. 1 is a view showing the configuration of a network in a first embodiment.

FIG. 1 is a view showing the configuration of a Diff-Serv network. The Diff-Serv network includes boundary node routers 2-1, 2-2, and 2-3 (collectively called a boundary node router 2), interior node routers 4-1 and 4-2 (collectively called an interior node router 4), and a SIP server 1.

The boundary node router 2 is disposed on a border between the Diff-Serv network and another network such as an access network. The boundary node router assigns a DSCP value and performs QoS control based on the DSCP value and others. The boundary node router 2 serves a user terminal (communication terminal) which sends at least a REGISTER message including a network user identifier and a user terminal identifier, through an access network. The boundary node router 2 performs QoS control for each user in accordance with a QoS control request from the SIP server 1.

The interior node router 4 is disposed in the Diff-Serv network and performs QoS control based on the DSCP value.

The SIP server 1 supports session establishment based on a SIP message. The SIP server 1 also gives the boundary node router 2 a QoS control request for each user. The SIP server 1 has a management table storing the QoS types of the individual users and can make a QoS control request for each user with reference to the management table. The configuration of the management table will be described later in further detail.

In FIG. 1, the SIP server 1 has a proxy server function, a redirect server function, and a register server function, for ease of explanation. These functions may be implemented by separate apparatuses or servers. The separate servers should exchange information with one another under the SIP protocol.

In the configuration shown in FIG. 1, each user name is described in the format of "account@domain". User A having a user name of userA@left.net uses user terminal A 3-1 at 10.10.10.10, and user terminal A 3-1 is connected to boundary node router A 2-1 at 192.168.10.1 through access network A. In this configuration, the terminals and routers use IP addresses, and user names are SIP URIs.

User C using a user name of userc@right.net uses user terminal C 3-3 at 10.10.30.10, and user terminal C 3-3 is connected to boundary node router C 2-3 at 10.12.34.5 through access network C. When the SIP server 1 establishes a session, user A and user C can communicate with given QoS, through boundary node router A 2-1, interior node routers A 4-1 and B 4-2, and boundary node router C 2-3, for instance. The accounts and addresses listed here are examples, and actual accounts and addresses may be different.

Figure 2:
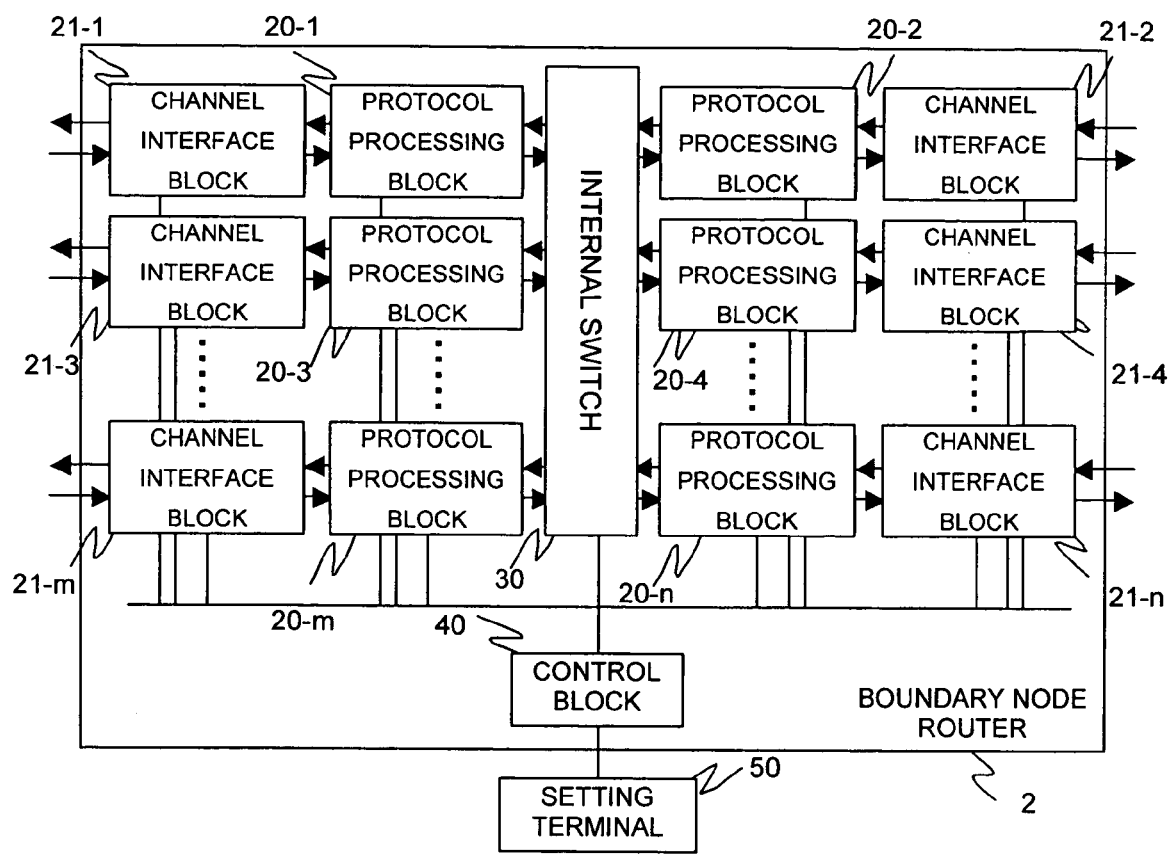
FIG. 2 shows a block diagram of a boundary node router of the first embodiment.

FIG. 2 shows a block diagram of the boundary node router 2.

The boundary node router 2 includes protocol processing blocks 20-1 to 20-*n*, channel interface blocks 21-1 to 21-*n*, an internal switch 30, and a control block 40.

The channel interface block 21 functions as a physical interface with a network. The internal switch 30 performs packet switching between interfaces. The control block 40 controls the whole apparatus, and adds the identifier of the router itself to a certain message. The protocol processing block 20 transfers a received packet and determines whether the received packet is a SIP message. The determination of the SIP message and the addition of the router identifier may be performed by an appropriate processing block in the boundary node router.

The boundary node router 2 has a connection interface with a setting terminal 50, in addition to the channel interface 21. The setting terminal 50 can be connected to the control block 40 and can make settings of the boundary node router 2.

Figure 3:
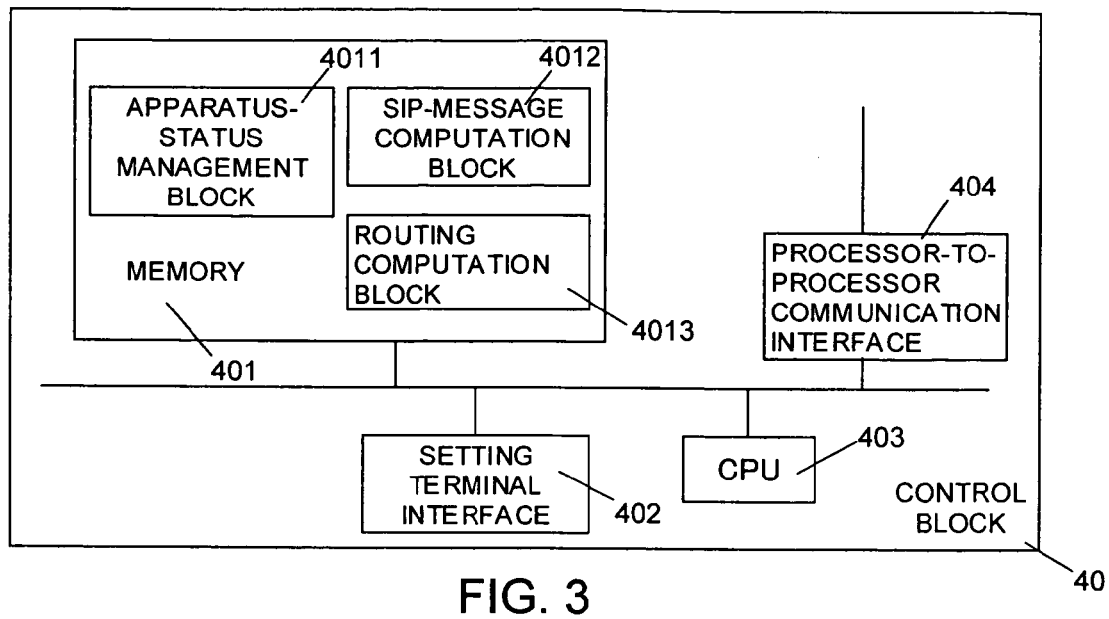
FIG. 3 shows a block diagram of a control block in the boundary node router of the first embodiment.

FIG. 3 shows a block diagram of the control block 40 in the boundary node router 2. The control block 40 includes a CPU 403, a memory 401, and a processor-to-processor communication interface 404. A setting terminal interface 402 may also be included.

The CPU 403 executes processing. The memory 401 stores a processing program and internal data. The processor-to-processor communication interface 404 is an interface for enabling communication with the processor of the protocol processing block 20, which will be described later. The setting terminal interface 402 is an interface for enabling connection to the setting terminal 50.

The memory 401 includes an apparatus-status management block 4011, a SIP-message computation block 4012, and a routing computation block 4013.

The apparatus-status management block 4011 manages apparatus statuses such as alarm generation and open/close statuses of channel interfaces. The SIP-message computation block 4012 updates or changes the header of a given SIP message. The routing computation block 4013 transfers an instruction to update the routing information from the setting terminal 50, for instance, to the protocol processing block 20. The blocks in the memory 401 are loaded and executed by the CPU 403.

Figure 4:
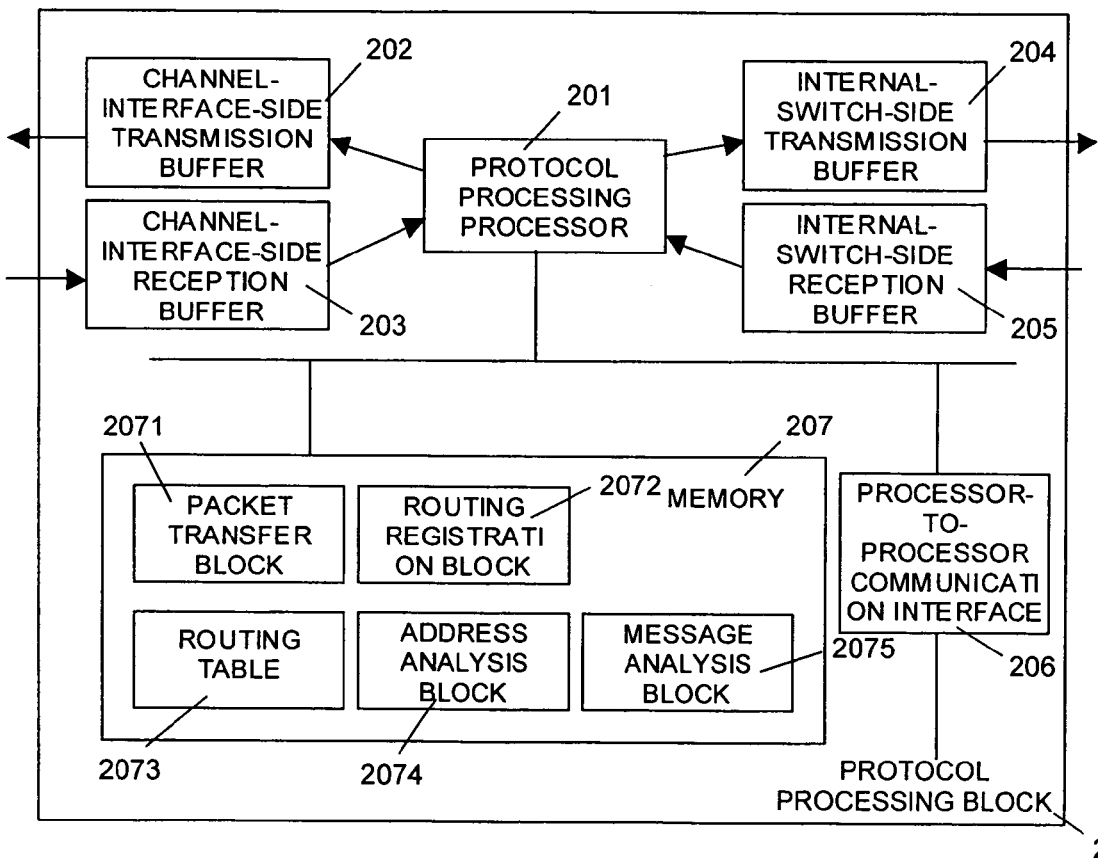
FIG. 4 shows a block diagram of a protocol processing block in the boundary node router of the first embodiment.

FIG. 4 shows a block diagram of the protocol processing block 20 in the boundary node router 2.

The protocol processing block 20 includes a protocol processing processor 201, a channel-interface-side transmission buffer 202, a channel-interface-side reception buffer 203, an internal-switch-side transmission buffer 204, an internal-switch-side reception buffer 205, a memory 207, and a processor-to-processor communication interface 206.

The protocol processing processor 201 executes processing. The channel-interface-side transmission buffer 202 is a buffer for holding a packet to be sent from the protocol processing processor 201 to the channel interface block 21. The channel-interface-side reception buffer 203 is a buffer for holding a packet to be sent from the channel interface blocks 21 to the protocol processing processor 201. The internal-switch-side transmission buffer 204 is a buffer for holding a packet to be sent from the protocol processing processor 201 to the internal switch 30. The internal-switch-side reception buffer 205 is a buffer for holding a packet to be sent from the internal switch 30 to the protocol processing processor 201. The processor-to-processor communication interface 206 is an interface for enabling communication with the CPU 403 of the control block 40.

The memory 207 stores a processing program and internal data. The memory 207 includes a packet transfer block 2071, a routing registration block 2072, a routing table 2073, an address analysis block 2074, and a message analysis block 2075, for instance.

The message analysis block 2075 analyzes the contents of a received packet and determines whether the packet is a SIP message. The packet transfer block 2071 locates a transfer destination on the basis of the address included in the packet and the information in the routing table 2073, and transfers the packet accordingly. The routing registration block 2072 incorporates updated routing information sent from the routing computation block 4013 of the control block 40, into the routing table 2073. The routing table 2073 holds the routing information. The address analysis block 2074 extracts an address from a received packet and makes an analysis. The blocks in the memory 207 are loaded and executed by the protocol processing processor 201.

The message analysis block 2075 and the SIP-message computation block 4012 are included in the protocol processing block 20 and the control block 40 respectively, but both of the blocks may be included in either the protocol processing block 20 or the control block 40.

The boundary node router 2 can further include means for receiving from the SIP server 1 a QoS control instruction depending on the QoS type specified for the user identifier or the updated terminal identifier and means for executing QoS control for each user in accordance with the received instruction. These means can be provided in either the control block 40 or the internal switch 30.

Figure 7:
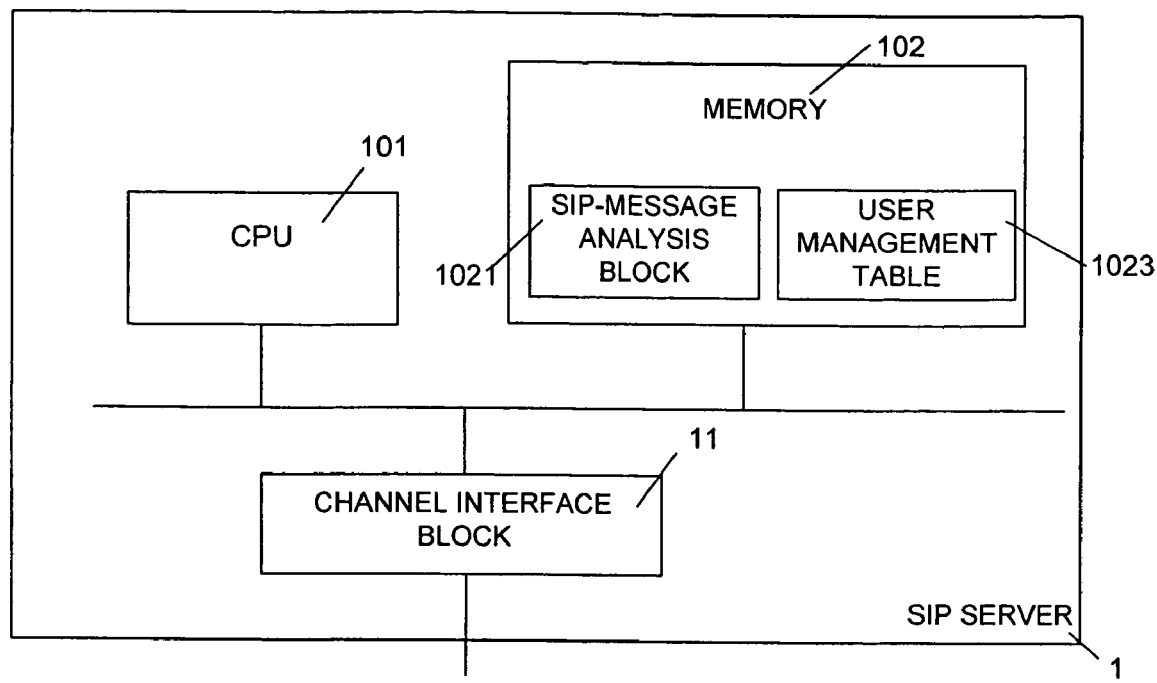
FIG. 7 shows a block diagram of a SIP server of the first embodiment.

FIG. 7 shows a block diagram of the SIP server 1.

The SIP server 1 includes a channel interface block 11, a CPU 101, and a memory 102. The channel interface block 11 serves a channel. The CPU 101 controls the entire apparatus and executes processing. The memory 102 stores a processing program and internal data.

The memory 102 includes a SIP-message analysis block 1021 and a user management table 1023. The SIP-message analysis block 1021 analyzes a received SIP message and determines whether the message is a REGISTER message or an Unauthorized message, for instance. The SIP-message analysis block 1021 can also manage user information and other information. The user management table 1023 stores the router serving position information and information for QoS control, of individual users. In the user management table 1023, a user name, a user IP address, a router IP address of a router serving the user terminal, and a QoS type are associated with each other and stored. The block in the memory 102 is loaded and executed by the CPU 101.

The SIP server 1 can also have means for instructing the router 2 identified by an updated router identifier to perform QoS control in accordance with the QoS type corresponding to the user identifier or the updated terminal identifier, with reference to the user management table 1023.

(Table Configuration)

Figure 8:
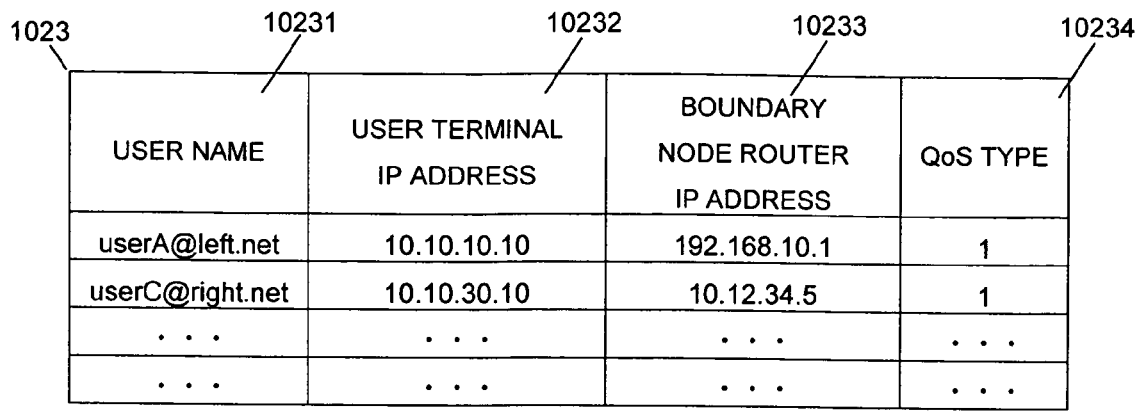
FIG. 8 is a view showing the configuration of a user management table of the first embodiment.

FIG. 8 shows a sample configuration of the user management table 1023 in the SIP server 1. In the user management table 1023, a user terminal address 10232, a boundary node router address 10233 of a boundary node router serving the user terminal, and a QoS type 10234 are specified in advance in association with a user name 10231. The user name can be SIP URI, and the user terminal address and the router address can be an IP address.

The table shown in FIG. 8 lists the information of the network configuration shown in FIG. 1. For instance, user A having a user name of userA@left.net, user terminal A at 10.10.10.10, and boundary node router A 2-1 at 192.168.10.1 are correlated, and QoS type 1 is specified for this combination.

User C having a user name of userC@right.net, user terminal C at 10.10.30.10, and boundary node router C 2-3 at 10.12.34.5 are correlated, and QoS type 1 is specified for this combination. These information items can be specified by the maintenance person when a subscription starts or when an address is changed.

The CPU 101 in the SIP server 1 recognizes the QoS type specified in the table 1023 and specifies QoS of the corresponding boundary node router. Then, user A and user C can communicate with given QoS (QoS type 1, in the shown example).

The shown table indicates that the same QoS type is specified for both user A and user C. However, the individual boundary node routers may have different QoS settings.

Figure 9:
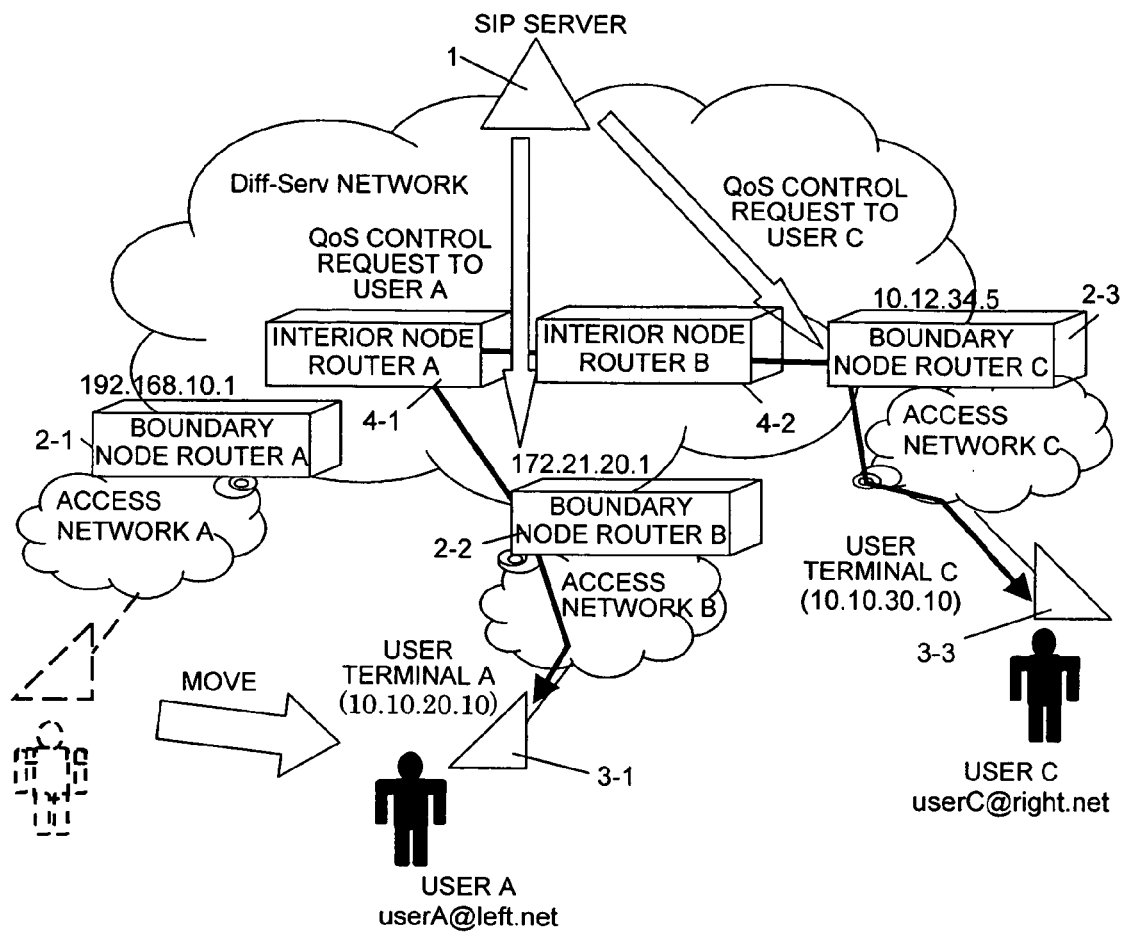
FIG. 9 is a view showing the configuration of another network of the first embodiment.

FIG. 9 is a view showing that user terminal A 3-1 in FIG. 1 is moved and connected through access network B to boundary node router B 2-2 at 172.21.20.1 and is going to communicate with user terminal C 3-3. After the movement, the address of user terminal A is changed to 10.10.20.10.

The user management table of the SIP server 1 must be updated in accordance with an update instruction from the boundary node router serving user terminal A 3-1. Otherwise, the SIP server 1 would make a QoS control request to the router before the movement, and user A would not be given the same QoS service as shown in FIG. 1.

(Processing Flow)

Figure 11:
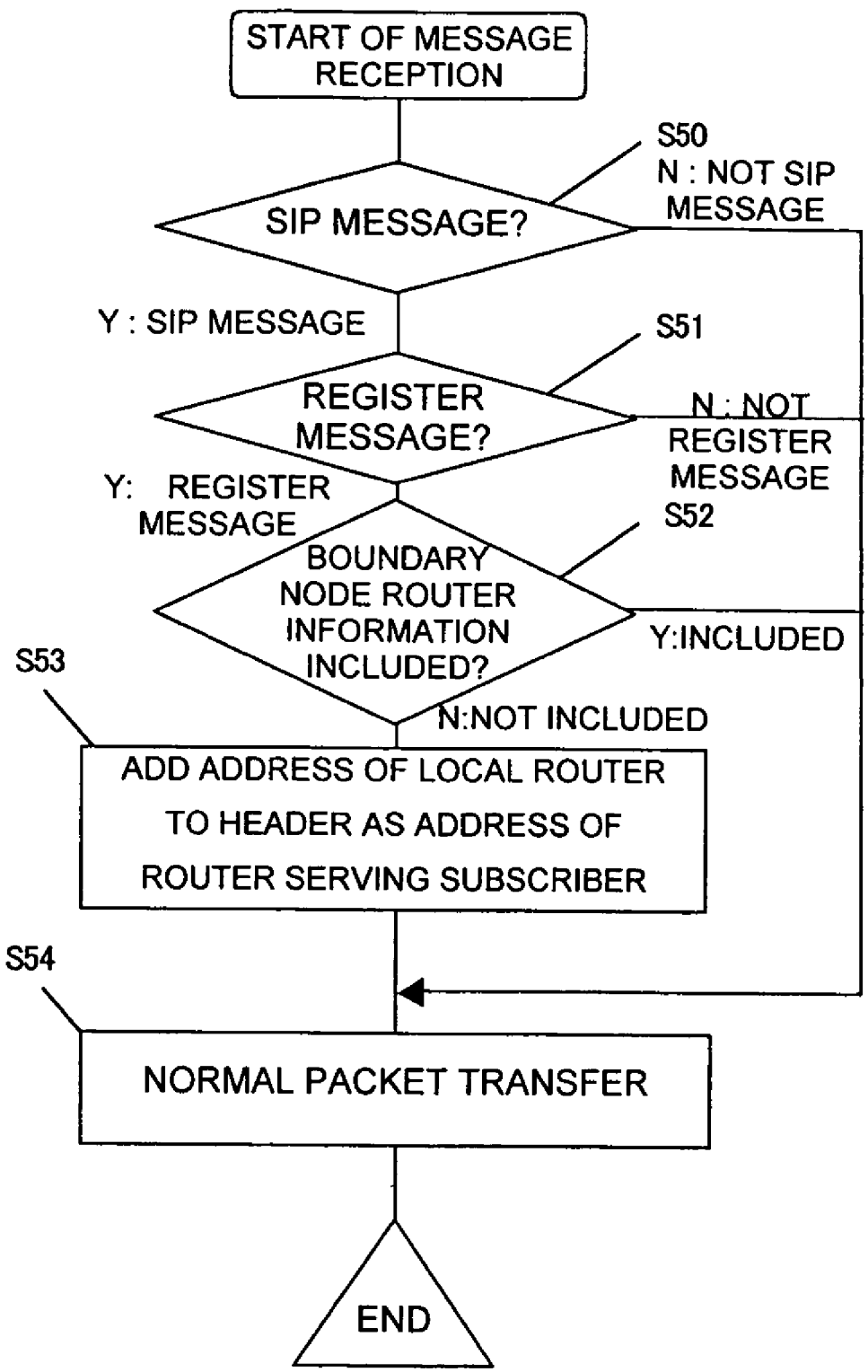
FIG. 11 shows a flowchart of the processing of the boundary node router in the first embodiment.
Figure 12:
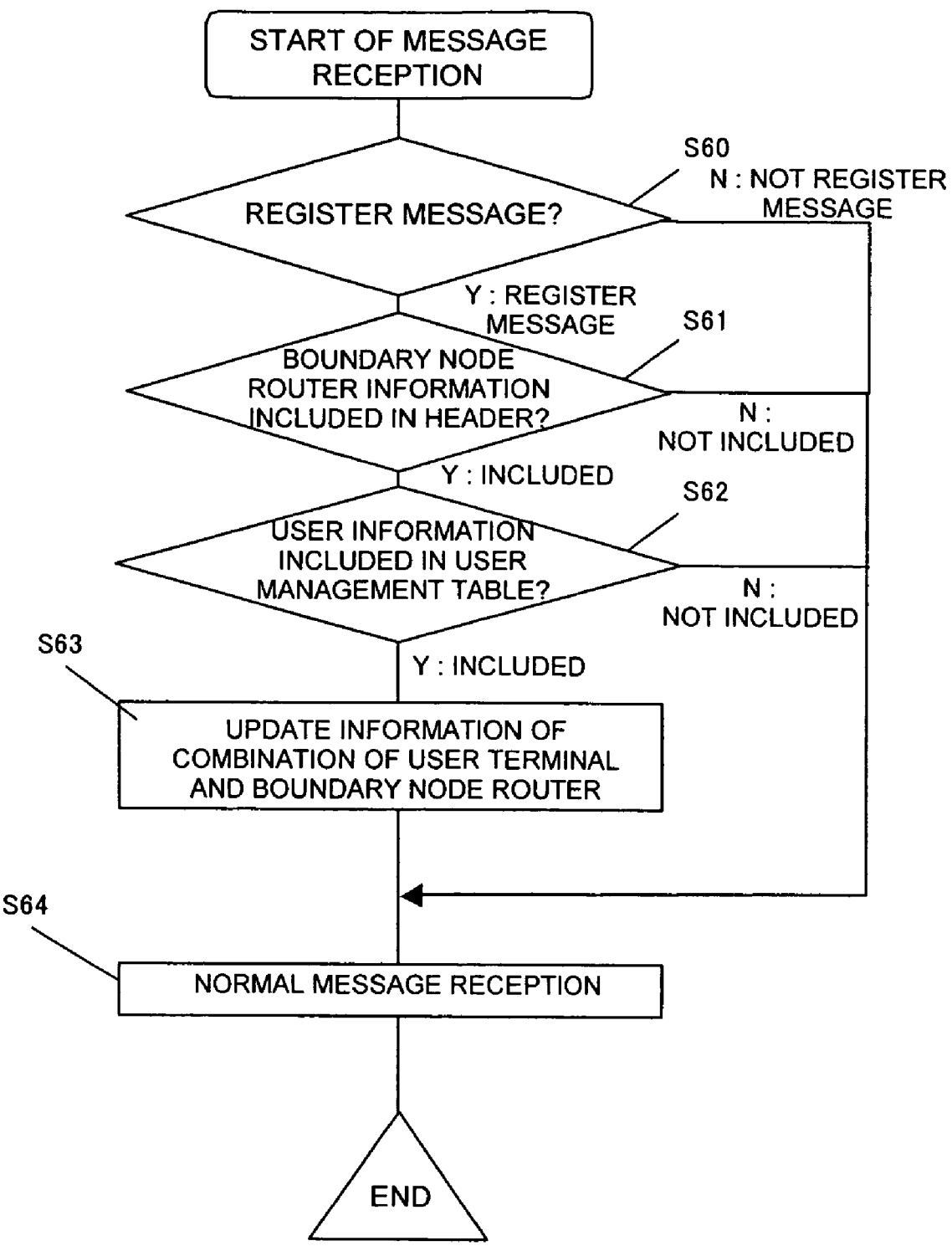
FIG. 12 shows a flowchart of the processing of the SIP server in the first embodiment.

FIG. 11 shows a flowchart of processing performed when the boundary node router of the first embodiment receives a packet. FIG. 12 shows a flowchart of processing performed when the SIP server 1 receives a SIP message from the user terminal 3. With reference to FIGS. 11 and 12, the processing to update the user management table 1023 in the SIP server 1 will be described next.

The user terminal 3 sends a REGISTER message including the user ID and the user terminal ID, to the SIP server 1, at initialization and periodically.

The message analysis block 2075 in the protocol processing block 20 of the boundary node router 2 analyzes the received packet and checks whether the received packet is a SIP message (step S50). For instance, when the protocol processing processor 201 receives a packet, the message analysis block 2075 checks whether the received packet is a SIP message. If the received packet is not a SIP message, the processing goes to step S54. If the received packet is a SIP message, the protocol processing block 20 transfers the SIP message through the processor-to-processor communication interface 206 to the control block 40. The protocol processing processor 201 can manage the processing of each block in memory 207.

The control block 40 receives the SIP message transferred from the protocol processing block 20 via the processor-to-processor communication interface 404, and the SIP-message computation block 4012 checks whether the transferred message is a REGISTER message (step S51). For instance, the SIP-message computation block 4012 analyzes the SIP message and determines whether a message type indicates REGISTER. If the SIP message is made up of a plurality of packets, the SIP-message computation block 4012 may analyze the message after a certain number of packets are accumulated.

If the transferred message is not a REGISTER message, the SIP-message computation block 4012 returns the packet through the processor-to-processor communication interface 404 to the protocol processing block 20, and the processing goes to step S54.

If the transferred message is a REGISTER message, the SIP-message computation block 4012 further analyzes the header of the REGISTER message and checks whether the information of a boundary node router is included (step S52). If the header of the REGISTER message contains boundary node router information, which is given by another boundary node router 2, the SIP-message computation block 4012 returns the packet through the processor-to-processor communication interface 404 to the protocol processing block 20, and the processing goes to step S54. If the header of the REGISTER message contains boundary node router information, the local router is not a boundary node router serving the user terminal.

If the header of the REGISTER message does not contain boundary node router information, the SIP-message computation block 4012 adds the address of the local router as the address of the boundary node router serving the user terminal 3, to the header of the REGISTER message (step S53), and the processing goes to step S54. If the header of the REGISTER message does not contain boundary node router information, the local router is the boundary node router 2 serving the user terminal. By checking the presence or absence of the boundary node router information in step S52, the addition of redundant boundary node router information can be avoided when the message is transferred through a plurality of routers of this embodiment.

In step S54, the packet transfer block 2071 transfers a non-SIP message and a packet returned from the SIP-message computation block 4012, to the next network in the same way as in a usual router.

The addition of information by the SIP-message computation block 4012 will be described next in further detail, with reference to FIGS. 5 and 6.

FIG. 5 is a view showing the header 7 of a REGISTER message which is sent from the user terminal 3 and received by the boundary node router 2. The header 7 includes a message type 70, a user address 71, and a user-terminal address 72. FIG. 6 is a view showing the header 7 of a REGISTER message, to which the boundary node router information 73 is added by the SIP-message computation block 4012.

The SIP-message computation block 4012 analyzes the header 7 of the message sent from the user terminal 3 and judges from the message type 70 whether the message is a REGISTER message. The SIP-message computation block 4012 adds boundary node router information 73 such as the local IP address to the REGISTER message, as shown in FIG. 6 (step S53 in FIG. 11).

If the user terminal 3 is moved as shown in FIG. 9, for instance, boundary node router B 2-2 adds address 172.21.20.1 of itself to the header 7 of the REGISTER message sent by the user terminal 3.

The element of the header information to be added here may be either a new element or an existing element that can be recognized by the SIP server and the boundary node router. In FIG. 6, a new header information element, QoS-Router, is added.

For instance, the address of boundary node router B 2-2 can be added by using an existing header information element, as described below. If the Error-Info element in the header of the REGISTER message is used to add address 172.21.20.1 of boundary node router B 2-2, the element can be specified as "Error-Info: Boundary-RouterB<172.21.20.1>", and the message with the updated header should be sent to the SIP server 1. The Warning element or another appropriate header information element can also be used in the same manner.

FIG. 12 is a flowchart of processing performed when the SIP server 1 receives a SIP message from the user terminal 3.

When the SIP server 1 or the CPU 101 receives a packet or a message sent via the channel interface block 11, the SIP-message analysis block 1021 analyzes the received packet or message and determines whether the packet or message is a REGISTER message of the SIP protocol (step S60).

If the SIP-message analysis block 1021 determines that the received message is not a REGISTER message, the processing goes to step S64.

If the received message is a REGISTER message, the SIP-message analysis block 1021 checks the information in the header of the REGISTER message to see whether the boundary node router information 73 of the router serving the user terminal is included (step S61). The SIP-message analysis block 1021 checks whether the header of the message includes QoS-Router, Error-Info specified to add boundary node router information, or another element.

If the SIP-message analysis block 1021 cannot find the boundary node router information 73, the processing goes to step S64. If the boundary node router information 73 is found, the SIP-message analysis block 1021 checks whether the user management table 1023 includes the information of the user sending the SIP message (step S62). For instance, the SIP-message analysis block 1021 extracts the user name 71 (SIP URI, for instance) from the header of the message, and searches through the user name field of the user management table 1023 for the corresponding user name.

If the SIP-message analysis block 1021 cannot find the corresponding user name, the processing goes to step S64. If the corresponding user name is found, the SIP-message analysis block 1021 updates the user management table 1023 in which the address of the user terminal 3 used by the user and the address of the boundary node router serving the user terminal 3 are associated (step S63), and the processing goes to step S64. More specifically, the SIP-message analysis block 1021 extracts the user terminal address 72 and the boundary node router information 73 from the REGISTER message. Then, the SIP-message analysis block 1021 rewrites the user terminal IP address 10232 and the boundary node router IP address 10233 associated with the user name in the user management table 1023, to the extracted user terminal address 72 and the extracted boundary node router information 73.

In step S64, the SIP-message analysis block 1021 performs normal message reception processing. If the processing of step S63 has been executed, the processing of step S64 may be omitted and the sequence may be terminated.

Figure 10:
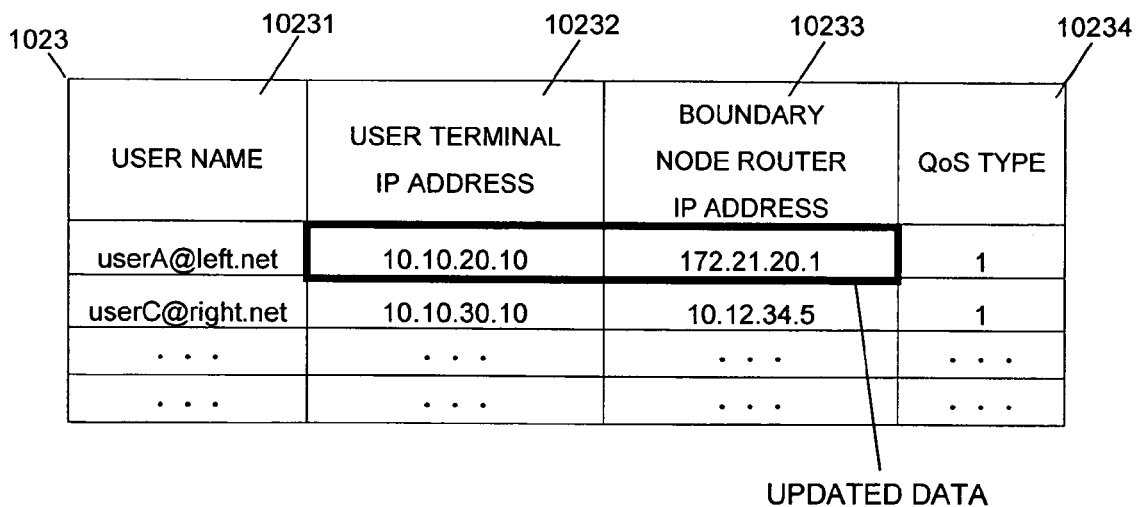
FIG. 10 is a view showing the configuration of a user management table of the first embodiment.

FIG. 10 shows a configuration of the updated table. The user management table 1023 of the SIP server 1 contains information, as shown in FIG. 8. If the user name of moved user A is found in the table, the corresponding user terminal address and boundary node router address are rewritten.

If user terminal A 3-1 is moved and if the address of the user terminal is changed, as shown in FIG. 9, the user terminal address corresponding to user A having a user name of userA@left.net is changed from 10.10.10.10 to 10.10.20.10. The corresponding boundary node router address is changed from the address 192.168.10.1 of boundary node router A 2-1 to address 172.21.20.1 of boundary node router B 2-2. These pieces of information are included in the header 7 of the REGISTER message sent from the boundary node router 2.

The movement also changes the user terminal address, and the change can be incorporated by a known technology: Generally, the changed address is automatically assigned by a DHCP server in the access network and is recognized by the user terminal.

The SIP server 1 checks the updated user management table 1023 and gives the router identified by the corresponding router identifier an instruction to perform QoS control in accordance with the QoS type corresponding to the user identifier or the user terminal identifier.

When user A moves user terminal A 3-1 from boundary node router A 2-1 to boundary node router B 2-2 and wants to establish a SIP session through boundary node router B 2-2, the SIP server 1 references the user management table 1023 and specifies the QoS of boundary node router B 2-2 so that the same QoS service as provided by boundary node router A 2-1 (QoS 1, in this example) can be provided. Then, user terminal A 3-1 can receive the same QoS service as provided before the movement.

Accordingly, even if the user terminal 3 is moved, an unchanged QoS service can be provided by dynamically rewriting the table in the SIP server 1, without manually updating data in the SIP server 1 as a part of maintenance.

2. Second Embodiment

The boundary node router 2 of the first embodiment described above checks a message received from the user terminal 3, adds certain information to the message, and transfers the message to the SIP server 1, to update information in the SIP server 1. A boundary node router 2 of a second embodiment checks a message received from a SIP server 1, adds certain information to the message, and transfers the message to a user terminal 3, to update information in the SIP server 1 from the user terminal 3.

The second embodiment uses the same apparatus configuration and the same table configuration as the first embodiment described above, and the description of those configurations will be omitted.

Figure 13:
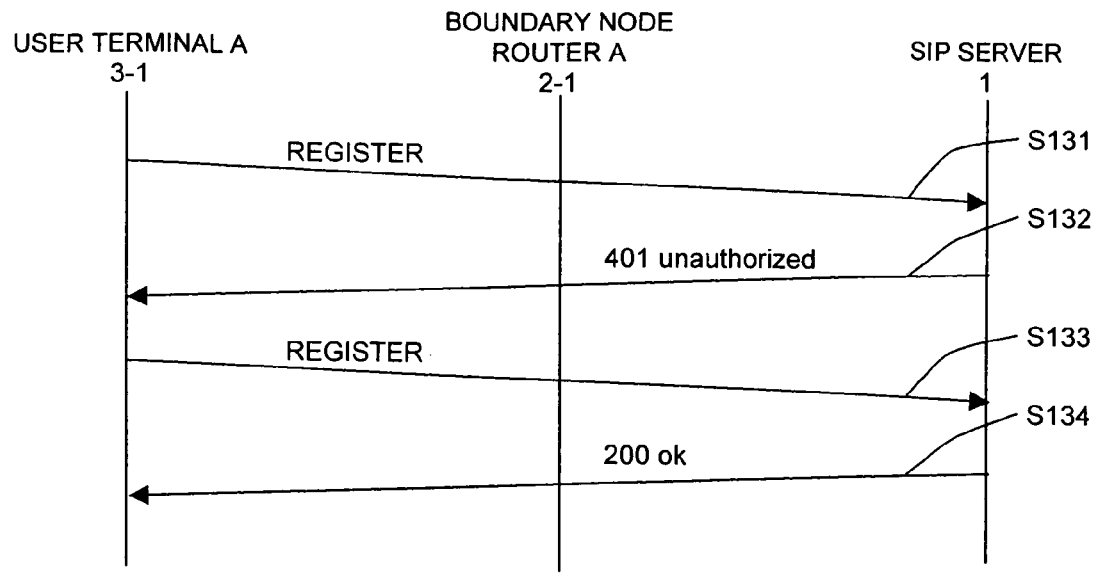
FIG. 13 shows a conventional SIP authentication sequence.

FIG. 13 shows a typical message sequence for terminal authentication by the SIP protocol. First, the normal terminal authentication sequence will be described.

User terminal A 3-1 to be served by the SIP server 1 sends a REGISTER message which does not include certain authentication information, via boundary node router A 2-1 to the SIP server 1 (step S131). The SIP server 1 confirms that the REGISTER message does not include authentication information, and returns a 401 Unauthorized message (instruction message) including a nonce value, a realm value, and other authentication information to user terminal A 3-1, encouraging the execution of digest authentication (step S132). The 401 Unauthorized message from the SIP server 1 is sent via boundary node router A 2-1 to user terminal A 3-1.

In response to the 401 Unauthorized message received from the SIP server 1, user terminal A 3-1 sends another REGISTER message to the SIP server 1, using the nonce value and the realm value included in the received message (step S133). The user terminal 3 is specified in advance to send a REGISTER message in response to the 401 Unauthorized message. User terminal A 3-1 may specify the user ID and password (authentication information) and incorporate the information into the REGISTER message, in steps S131 or S133.

The SIP server 1 checks whether the authentication information in the received message matches stored authentication information, for instance. If the authentication is successful, the SIP server 1 sends a 200 OK message to user terminal A 3-1 (step S134). Terminal authentication by SIP is generally performed as described above.

Figure 14:
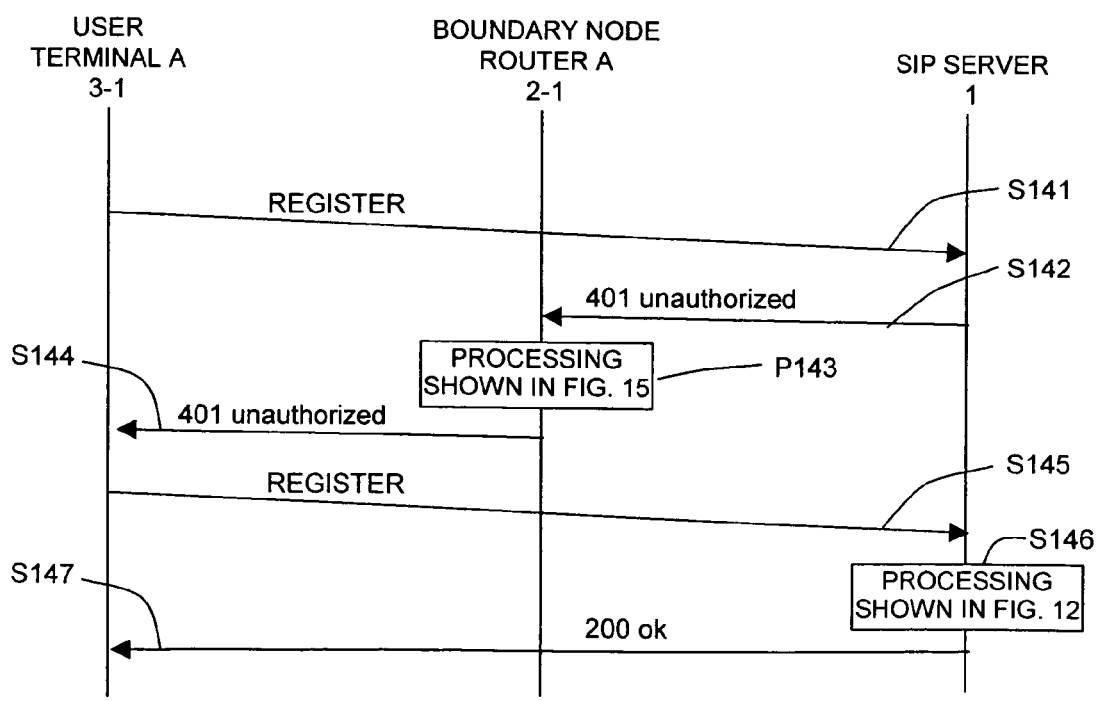
FIG. 14 shows a SIP authentication sequence of a second embodiment.

FIG. 14 shows a message sequence for terminal authentication by the SIP protocol and for updating the user management table, according to the present embodiment.

User terminal A 3-1 to be served by the SIP server 1 sends a REGISTER message which does not include authentication information, via boundary node router A 2-1 to the SIP server 1 (step S141), as in step S131, described above. In this embodiment, the boundary node router 2 receives the REGISTER message and transfers the message to the SIP server 1, just like a normal packet or message.

The SIP server 1 receives the REGISTER message and confirms that the message does not include authentication information, and returns a 401 Unauthorized message including a nonce value, a realm value, and others to user terminal A 3-1, encouraging the execution of digest authentication (step S142).

Boundary node router A 2-1 of this embodiment checks all the passing packets and messages. When the 401 Unauthorized message passes, boundary node router A 2-1 executes processing shown in FIG. 15, which will be described later, and adds boundary node router information to the 401 Unauthorized message (step S143). Boundary node router A 2-1 also sends the 401 Unauthorized message with boundary node router information added to user terminal A 3-1 (step S144).

User terminal A 3-1 receives the 401 Unauthorized message from the SIP server 1 via boundary node router A 2-1 and sends another REGISTER message to the SIP server 1 (step S145), using the nonce value, the realm value, and other boundary node router information included in the received message. In this embodiment, the boundary node router information added by boundary node router A 2-1 is added to the header of the REGISTER message to be sent. User terminal A 3-1 may specify a user ID and a password and include these items in the REGISTER message sent in step S141 or S145.

The SIP server 1 checks whether the authentication information in the received message matches stored authentication information, for instance. If the authentication is successful, the same processing as performed for the first embodiment is performed, as shown in FIG. 12, for instance. The corresponding user terminal address and the corresponding boundary node router address are rewritten in the user management table 1023 (step S146). Then, the SIP server 1 returns a 200 OK message to user terminal A 3-1 (step S147).

Figure 15:
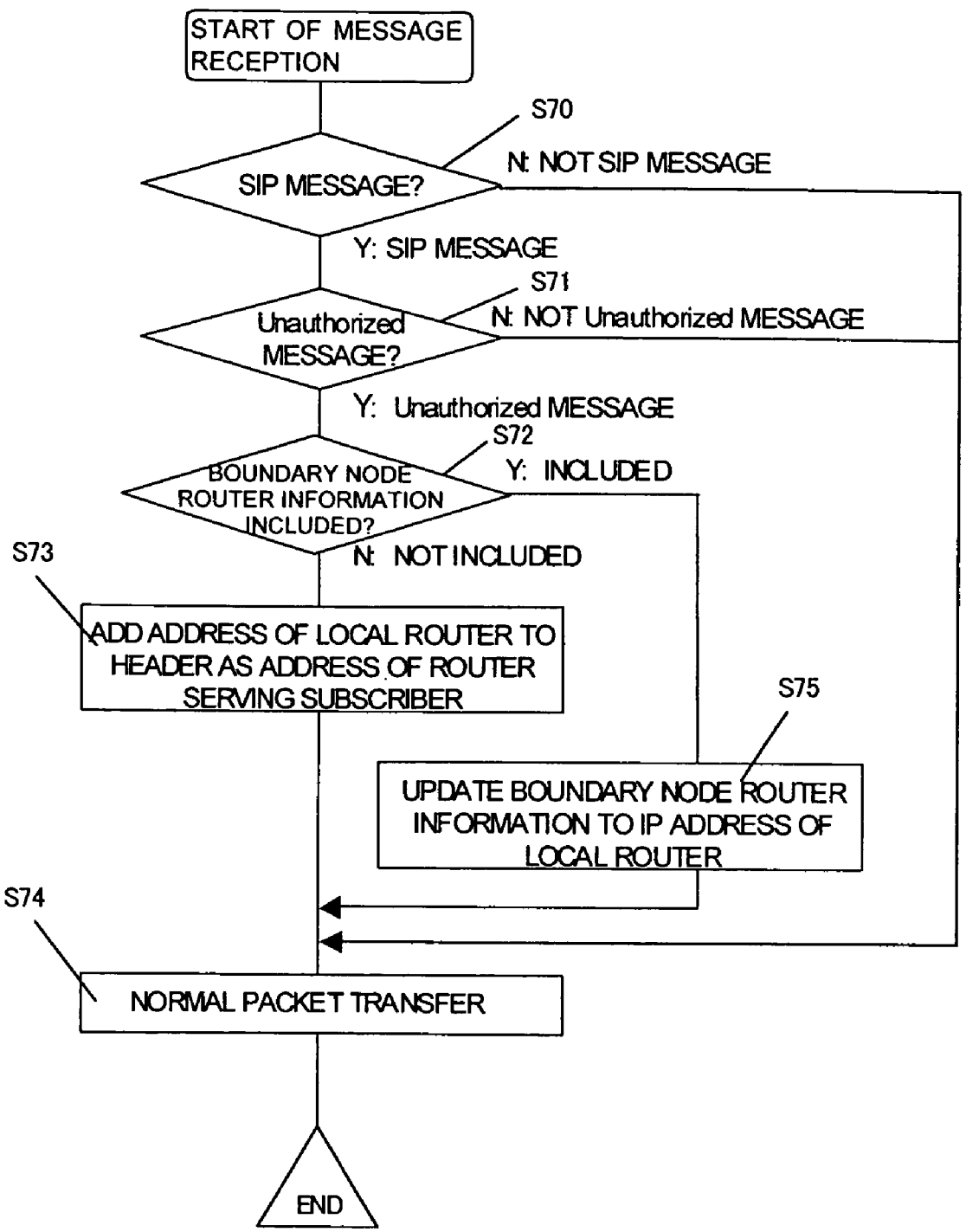
FIG. 15 is a flowchart of the processing of a boundary node router in the second embodiment.

FIG. 15 is a flowchart of processing performed when the boundary node router 2 receives a packet.

When the boundary node router 2 receives a packet, a message analysis block 2075 in a protocol processing block 20 checks the received packet and judges whether the received packet includes a SIP message (step S70). For instance, when a protocol processing processor 201 receives a packet, the message analysis block 2075 checks whether the received packet includes a SIP message. If the received packet does not include a SIP message, the processing goes to step S74. If the received packet includes a SIP message, the protocol processing block 20 transfers the SIP message via a processor-to-processor communication interface 206 to a control block 40. The protocol processing processor 201 can manage the processing of blocks in a memory 207.

The control block 40 receives the SIP message transferred from the protocol processing block 20 via a processor-to-processor communication interface 404, and a SIP-message computation block 4012 checks whether the transferred message is a 401 Unauthorized message (step S71). For instance, the SIP-message computation block 4012 analyzes the SIP message and checks whether the message is a REGISTER message. If the SIP message is made up of a plurality of packets, the SIP-message computation block 4012 may analyze the message after a certain number of packets are accumulated.

If the transferred message is not a 401 Unauthorized message, the SIP-message computation block 4012 returns the packet through the processor-to-processor communication interface 404 to the protocol processing block 20, and the processing goes to step S74. If the transferred message is a 401 Unauthorized message, the SIP-message computation block 4012 further analyzes the header of the 401 Unauthorized message and checks whether boundary node router information is included (step S72).

If the header of the REGISTER message contains the boundary node router information given by a different boundary node router 2, the SIP-message computation block 4012 updates or changes the boundary node router information to the local router identifier (step S75), and the processing goes to step S74. If the header of a message contains boundary node router information, the local router is closer to the user than the different boundary node router.

If the header of the 401 Unauthorized message contains no boundary node router information, the SIP-message computation block 4012 adds the address of the local router to the header of the 401 Unauthorized message, as the address of the boundary node router serving the user terminal 3 (step S73), and the processing goes to step S74.

In step S74, the packet transfer block 2071 transfers the received packet to the next network, as in a normal router.

The addition and update of certain information will be described in further detail, with reference to FIGS. 16 to 19. FIG. 16 is a view showing the header of a 401 Unauthorized message 142 sent from the SIP server 1 and received by the boundary node router 3 (message sent in step S142, for instance). The header includes a message type 160, a user name 161, and others.

If the message is judged to be a 401 Unauthorized message after the analysis of the header shown in FIG. 16, boundary node router A 2-1 adds boundary node router information such as the IP address of the local router (step S73 in FIG. 15) and sends the message to user terminal A 3-1.

FIG. 17 is a view showing an example of a 401 Unauthorized message 144 with boundary node router information 163 added. If user terminal A 3-1 is moved as shown in FIG. 9, the address 172.21.20.1 of boundary node router B 2-2 is added or updated in the header of the 401 Unauthorized message 144 sent by user terminal A 3-1.

The element of header information to be added here may be either a new header information element or an existing header information element that can be recognized by the SIP server and the boundary node router. A new header information element, QoS-Router 163, is added in FIG. 17.

FIG. 18 is a view showing the header of a REGISTER message 133 sent by user terminal A 3-1 and received by the SIP server 1 (a message sent in step S133, for instance). The header includes a message type 180, a user address 181, a user terminal address 182, and others.

FIG. 19 is a view showing the header of a REGISTER message 145 sent by user terminal A 2-1 (a message sent in step S145, for instance) which has received the 401 Unauthorized message with the boundary node router information 183 added by boundary node router A 2-1.

The headers shown in FIGS. 18 and 19 are different in that the boundary node router information 183 added by boundary node router A 3-1 is returned. More specifically, the boundary node router information 183 (IP address of the boundary node router) is added or updated in the header shown in FIG. 19. The user management table 1023 of the SIP server 1 is updated in accordance with the user terminal address 182 and the boundary node router information 183 included in the REGISTER message 145 from the user terminal.

When user A moves user terminal A 3-1 from boundary node router A 2-1 to boundary node router B 2-2 and wants to establish a SIP session through boundary node router B 2-2, as in the first embodiment, the SIP server 1 specifies the QoS type of boundary node router B 2-2, which serves user terminal A 3-1, so that the same QoS service as provided by boundary node router A 2-1 (QoS type 1 in this example) can be provided. Accordingly, user terminal A 3-1 can receive the same QoS service as provided before the movement.

Even if the user terminal 3 is moved, an unchanged QoS service can be provided by dynamically rewriting the table in the SIP server 1, without manually updating data in the SIP server 1 as a part of maintenance.

The first and second embodiments have been described by taking an example of moving a user terminal to a different router. The same applies when the address information of a user terminal changes. The address information of a user terminal changes when the user uses a different terminal, when the address of the user terminal changes, and in some other cases.

What is claimed is:

1. A router for serving a communication terminal which sends a REGISTER message including a user identifier and a terminal identifier and for performing Quality of Service (QoS) control for each user under an instruction from a Session Initiation Protocol (SIP) server;

the router being used in a network system comprising:
a SIP server for storing a terminal identifier of the communication terminal, a router identifier of the router serving the communication terminal, and a certain QoS type, in association with the user identifier, and for instructing the router identified by the corresponding router identifier to perform QoS control in accordance with the QoS type corresponding to the user identifier or the terminal identifier;

the router comprising:
means for judging whether a received packet or a received message is a SIP message;
means for analyzing and determining whether the message judged to be a SIP message is a REGISTER message, for adding the router identifier of the router to the REGISTER message including the user identifier and terminal identifier given by the communication terminal if the message is a SIP message and a REGISTER message, and for transferring the REGISTER message including the added router identifier to the SIP server so that the terminal identifier and router identifier stored in association with the user identifier are updated in the SIP server;

means for receiving a QoS control instruction corresponding to the QoS type associated with the user identifier or the updated terminal identifier, from the SIP server; and means for performing QoS control for each user under the received instruction.

2. A router for serving a communication terminal which sends, in response to an instruction message given for authentication, a REGISTER message including a user identifier, a terminal identifier, and a router identifier included in the instruction message and for performing Quality of Service (QoS) control for each user under an instruction from a server;

the router being used in a network system comprising:
a Session Initiation Protocol (SIP) server for storing a terminal identifier of the communication terminal, a router identifier of the router serving the communication terminal, and a certain QoS type, in association with the user identifier, for instructing the router identified by the corresponding router identifier to perform QoS control in accordance with the QoS type corresponding to the user identifier or the terminal identifier, and for sending an instruction message for authentication to the communication terminal;

the router comprising:
means for judging whether a received packet or a received message is a SIP message;
means for analyzing and determining whether the message judged to be a SIP message is an instruction message, for adding the router identifier of the router to the instruction message or updating the router identifier included in the instruction message to the router identifier of the router, if the message is a SIP message and an instruction message, and for transferring the instruction message including the added or updated router identifier to the communication terminal so as to make the communication terminal send a REGISTER message and to update the terminal identifier and the router identifier stored in association with the user identifier in the SIP server;

means for receiving a QoS control instruction corresponding to the QoS type associated with the user identifier or the updated terminal identifier, from the SIP server; and means for performing QoS control for each user under the received instruction.

3. A router according to claim 2, wherein the instruction message is an Unauthorized message.

4. A router according to claim 1, wherein the transfer means creates a new additional information header including the router identifier of the router and adds the created additional information header to a message or updates the header to the created additional information header, or adds the router identifier of the router to a preselected header or updates the router identifier in the preselected header.

5. A router according to claim 1, wherein the user identifier is a SIP Uniform Resource Identifier (URI), the terminal identifier is the Internet Protocol (IP) address of the communication terminal, and the router identifier is the IP address of the router.

6. A router according to claims 1, the router being disposed on the border between a Differentiated Service (Diff-Serv) network and a network connected to the communication terminal.

7. A Session Initiation Protocol (SIP) server for managing the Quality of Service (QoS) type of each user and for instructing a router serving a communication terminal to perform QoS control in accordance with the QoS type of each user;

the SIP server being used in a network system comprising:

the router, the router, serving a communication terminal which sends a REGISTER message including a user identifier and a terminal identifier to be used or a communication terminal which sends, in response to an instruction message given for authentication, a REGISTER message including a user identifier, a terminal identifier, and a router identifier included in the instruction message, and performing QoS control for each user under an instruction from a server;

the SIP server comprising:

a table for storing a terminal identifier of the communication terminal, a router identifier of the router serving the communication terminal, and a certain QoS type, in association with the user identifier;

means for analyzing a received message and determining whether the message is a REGISTER message;

means for extracting a user identifier, a terminal identifier, and a router identifier, if the message is a REGISTER message, from a REGISTER message generated when the router has added the router identifier of the router to the REGISTER message including the user identifier and the terminal identifier given by the communication terminal or from a REGISTER message sent from the communication terminal in response to an instruction message to which the router has added or updated the router identifier, sent from the server to the communication terminal, for referencing the table in accordance with the extracted user identifier, and for updating the terminal identifier and the router identifier associated with the corresponding user identifier to the extracted terminal identifier and the extracted router identifier; and means for instructing the router identified by the updated router identifier to perform QoS control in accordance with a QoS type associated with the user identifier or the updated terminal identifier, with reference to the table.

8. A network system comprising:

a router for serving a communication terminal which sends a REGISTER message including a user identifier and a terminal identifier and for performing Quality of Service (QoS) control for each user under an instruction from a server; and a Session Initiation Protocol (SIP) server for managing the QoS type of each user and for instructing the router serving the communication terminal to perform QoS control in accordance with the QoS type of each user;

the router comprising:

means for judging whether a received packet or a received message is a SIP message;

means for analyzing and determining whether the message judged to be an SIP message is a REGISTER message, for adding the router identifier of the router to the REGISTER message including the user identifier and terminal identifier given by the communication terminal if the message is a SIP message and a REGISTER message, and for transferring the REGISTER message with the router identifier added to the SIP server so that the terminal identifier and router identifier stored in association with the user identifier are updated in the SIP server;

means for receiving a QoS control instruction corresponding to the QoS type associated with the user identifier or the updated terminal identifier, from the SIP server; and means for performing QoS control for each user under the received instruction;

the SIP server comprising:

a table for storing a terminal identifier of the communication terminal, a router identifier of the router serving the communication terminal, and a certain QoS type, in association with the user identifier;

means for analyzing a received message and determining whether the message is a REGISTER message;

means for extracting a user identifier, a terminal, identifier, and a router identifier, if the message is a REGISTER message, from a REGISTER message generated when the router has added the router identifier of the router to the REGISTER message including the user identifier and the terminal identifier given by the communication terminal, for referencing the table in accordance with the extracted user identifier, and for updating the terminal identifier and the router identifier associated with the corresponding user identifier to the extracted terminal identifier and the extracted router identifier; and means for instructing the router identified by the updated router identifier to perform QoS control in accordance with a QoS type associated with the user-identifier or the updated terminal identifier, with reference to the table.

9. A network system comprising:

a router for serving a communication terminal which sends, in response to an instruction message given for authentication, a REGISTER message including a user identifier, a terminal identifier to be used, and a router identifier included in the instruction message and for performing Quality of Service (QoS) control for each user under an instruction from a server; and a Session Initiation Protocol (SIP) server for managing the QoS type of each user, for instructing the router serving the communication terminal to perform QoS control in accordance with the QoS type of each user, and for sending an instruction message for authentication to the communication terminal;

the router comprising:

means for judging whether a received packet or a received message is a SIP message;

means for analyzing and determining whether the message judged to be a SIP message is an instruction message, for adding the router identifier of the router to the instruction message or updating the router identifier included in the instruction message to the router identifier of the router if the message is a SIP message and an instruction message, and for transferring the instruction message including the added or updated router identifier to the communication terminal so as to make the communication terminal send a REGISTER message and to update the terminal identifier and the router identifier stored in association with the user identifier in the SIP server;

means for receiving a QoS control instruction corresponding to the QoS type associated with the user identifier or the updated terminal identifier, from the SIP server; and means for performing QoS control for each user under the received instruction;

the SIP server comprising:

a table for storing a terminal identifier of the communication terminal, a router identifier of the router serving the communication terminal, and a certain QoS type, in association with the user identifier;

means for analyzing a received message and determining whether the message is a REGISTER message;

means for extracting a user identifier, a terminal identifier, and a router identifier, if the message is a REGISTER message, from a REGISTER message sent from the communication terminal in response to an instruction message to which the router has added or updated the router identifier of the router, sent from the server to the communication terminal, for referencing the table in accordance with the extracted user identifier, and for updating the terminal identifier and the router identifier associated with the corresponding user identifier to the extracted terminal identifier and the extracted router identifier; and means for instructing the router identified by the updated router identifier to perform QoS control in accordance with the QoS type associated with the user identifier or the updated terminal identifier, with reference to the table.

* * * * *